United States Patent [19]
Wieland

[11] Patent Number: 4,850,646
[45] Date of Patent: Jul. 25, 1989

[54] DETACHABLE JOINT ASSEMBLY FOR FURNITURE FRAME

[75] Inventor: Roy M. Wieland, Fort Wayne, Ind.

[73] Assignee: R. M. Wieland Company, Kawkawlin, Mich.

[21] Appl. No.: 197,463

[22] Filed: May 23, 1988

[51] Int. Cl.$^4$ ............................................. A47C 7/00
[52] U.S. Cl. ................................... 297/444; 211/182; 403/297
[58] Field of Search .............. 403/333, 334, 376, 297, 403/367, 169, 278, 284; 312/257 SK; 211/182; 256/59, 65, 70; 297/440, 444; 5/282 R

[56] References Cited

U.S. PATENT DOCUMENTS

| | | | |
|---|---|---|---|
| 727,741 | 5/1903 | Brott | 403/264 X |
| 2,215,248 | 9/1940 | Murphy . | |
| 2,415,180 | 2/1947 | John | 182/228 |
| 2,670,250 | 2/1954 | Greene, Jr. | 403/274 X |
| 2,990,203 | 8/1959 | Grover . | |
| 3,288,307 | 11/1966 | Cook | 211/182 X |
| 3,372,950 | 3/1966 | Wind . | |
| 3,527,361 | 9/1970 | Janetka | 211/182 |
| 3,545,796 | 12/1970 | Nicholls | 403/297 X |
| 4,113,399 | 9/1978 | Hansen, Sr. | 403/361 X |
| 4,380,298 | 4/1983 | Harig | 211/189 X |
| 4,391,545 | 7/1983 | Zummer | 403/189 |
| 4,431,331 | 2/1984 | Brody | 403/189 X |
| 4,564,306 | 1/1986 | Rock et al. | 403/14 |
| 4,633,275 | 12/1986 | Hubbard | 403/333 X |

Primary Examiner—James T. McCall
Attorney, Agent, or Firm—Jeffers, Hoffman & Niewyk

[57] ABSTRACT

A furniture frame includes a plurality of frame members having rectangular tubular cross-sectional configurations. One of the frame members has a pair of elongated generally wedge-shaped parts rigidly attached thereto in spaced apart relation to one another thereon and projecting therefrom in generally parallel relation. A pair of other of the frame members have a cross brace frame member extending between and at its opposite ends rigidly attached to the other frame members so as to dispose the other frame members in generally parallel relation to one another. Each of the other frame members at same one of their opposite ends is open with generally wedge-shaped pockets defined therein by indented portions of the frame members located near the open ends thereof. The wedge-shaped pockets have configurations generally complementary to that of the wedge-shaped parts for removably receiving the wedge-shaped parts in a relatively tight, frictional fitting relation to provide the pair of other frame members in an assembled relationship relative to the one frame member. An attachment arrangement is provided for releasably securing the other frame members and the one frame member together once the wedge-shaped parts have been received within the wedge-shaped pockets and the members are in their assembled relationship.

15 Claims, 3 Drawing Sheets

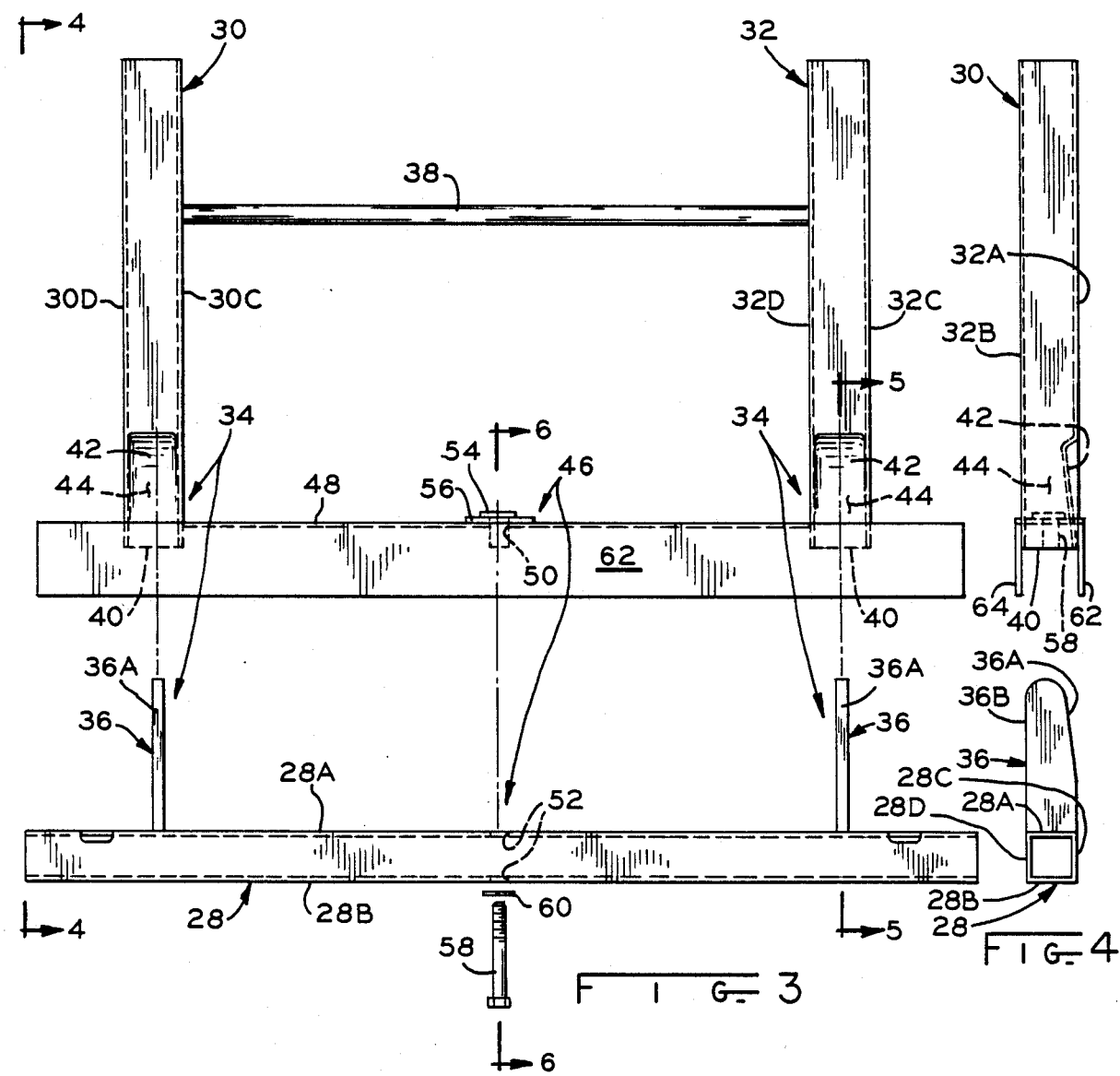

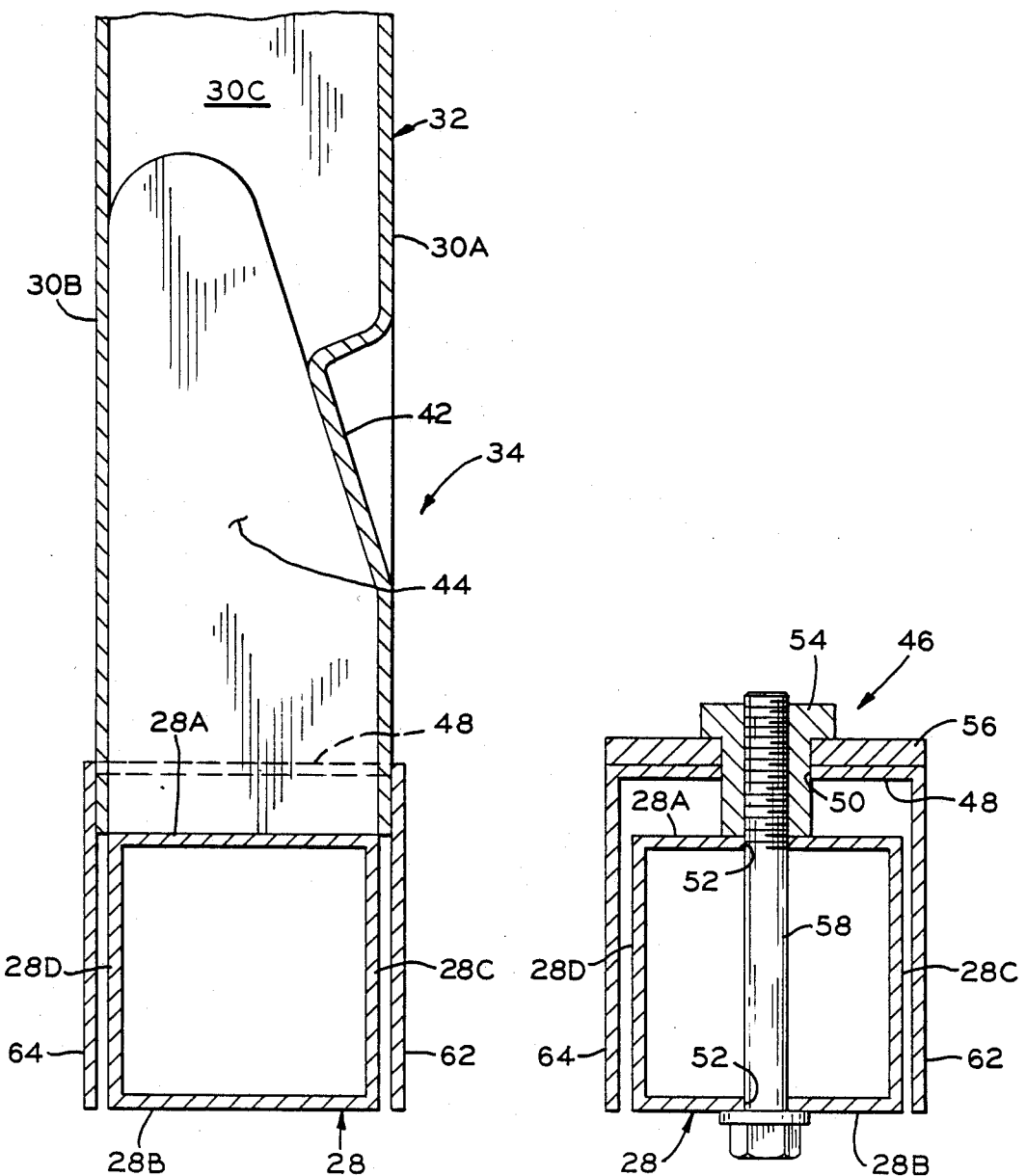

4,850,646

DETACHABLE JOINT ASSEMBLY FOR FURNITURE FRAME

BACKGROUND OF THE INVENTION

1. Field of the Invention

The present invention generally relates to furniture frames and, more particularly, is concerned with a joint assembly for assembling furniture frame members.

2. Description of the Prior Art

Furniture designed for use in institutions, such as schools and hospitals, must be sturdy and durable as well as comfortable and reasonable in cost. Design approaches which would satisfy some of these requirements frequently will conflict with others.

For instance, to minimize costs, it is ordinarily desirable to ship furniture in knock-down condition in order to save space and minimize potential damage during shipment. However, many furniture units, such as lounge-type chairs, are most desirably constructed with unitary one-piece frames for sturdiness and durability. Also, once furniture having knock-down frames are assembled and placed in use in facilities open to the public, they are subject to being taken apart and removed surreptitiously, unless special measures are taken.

Thus, it can be readily appreciated how difficult it is to provide designs which satisfy all of these requirements in the same unit of furniture. Nevertheless, there continues to be a need for an approach to furniture frame design whose objective is satisfaction of these requirements. It is perceived that for such approach to have some promise it must focus on the design of joint assemblies for connecting the frame members which will resolve the conflict between the requirements of knock-down capability but sturdiness and low cost but durability.

SUMMARY OF THE INVENTION

The present invention provides a furniture frame member joint assembly designed to satisfy the aforementioned needs. The joint assembly of the present invention is particularly designed for interconnecting rectangular tube furniture frame members so that they can be taken apart but have substantially the same sturdiness and rigidity when assembled together as a one-piece furniture frame. The ability to knock down the frame members allows considerable savings in packaging and shipping costs and reduction in damage incurred during shipping.

Several features enter into the construction of the joint assembly of the present invention. One feature relates to a joint composed of a wedge-shaped part projecting from one frame member and a wedge-shaped pocket defined in an open end of another frame member for receiving the wedge-shaped part in a relatively tight, frictional fitting relation. Another feature relates to the provision of the wedge-shaped part with a cross-sectional thickness that is smaller than the transverse width of the wedge-shaped pocket so that the assembled position of the one tube frame member can be adjusted along the other member. Still another feature relates to an attachment arrangement for securing and locking the members together when the wedge-shaped part has been adjusted to the desired position within the wedge-shaped pocket.

Accordingly, the present invention is directed to a detachable joint assembly in a furniture frame having a plurality of frame members. The joint assembly includes:

(a) an elongated generally wedge-shaped part projecting from one of the frame members; and (b) means defining a generally complementary wedge-shaped pocket in an open end of another of the frame members for removably receiving the wedge-shaped part in a relatively tight, frictional fitting relation to provide the one frame member in an assembled position relative to the another frame member. The wedge-shaped pocket is defined by an indented portion of the another frame member located adjacent the open end thereof.

More particularly, the cross-section of the wedge-shaped part has a thickness that is smaller than the transverse width between opposite sides of the wedge shaped pocket. The wedge-shaped part is thus capable of being slidably moved toward and away from the opposite sides of the wedge-shaped pocket so as to adjust the position of the wedge-shaped part within the wedge-shaped pocket between the opposite sides thereof and thereby adjust the assembled position of the one frame member along the another frame member.

Still further, the joint assembly includes:

(a) at least a pair of elongated generally wedge-shaped parts attached to one of the frame members in spaced apart relation to one another thereon and projecting therefrom;

(b) at least a pair of the frame members each having an open end with a generally wedge-shaped pocket defined therein for removably receiving one of the wedge-shaped parts in a relatively tight, frictional fitting relation to provide the frame member pair in assembled positions relative to the one frame member; and (c) in attachment arrangement operable for releasably securing the frame member pair and the one frame member together once the wedge-shaped parts have been adjusted to desired positions within the wedge-shaped pockets and the frame member pair have been adjusted to desired assembled positions along the one frame member.

The attachment arrangement includes a base member extending between and rigidly attached to the frame member pair adjacent their open ends. Also, the arrangement includes holes in the base member and the one frame member being aligned with one another once the frame member pair are in the desired assembled positions along the one frame member, and means in the form of a locking bolt insertable through the aligned holes and being fastenable to rigidly and releasably clamp the base member to the one frame member.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

1 and incorporating the detachable frame member joint assembly of the present invention.

FIG. 3 is a front end elevational view of the members of the frame which incorporate the joint assembly, with the components of the assembly being illustrated in exploded form.

FIG. 4 is a side end elevational view as seen along line 4—4 of FIG. 3 without the fastener being shown.

FIG. 5 is an enlarged cross-sectional view as taken along line 5—5 of FIG. 3 after the components are assembled together.

FIG. 6 is an enlarged cross-sectional view as taken along line 6—6 of FIG. 3 after the components are assembled together.

DETAILED DESCRIPTION OF THE INVENTION

Figure 1:
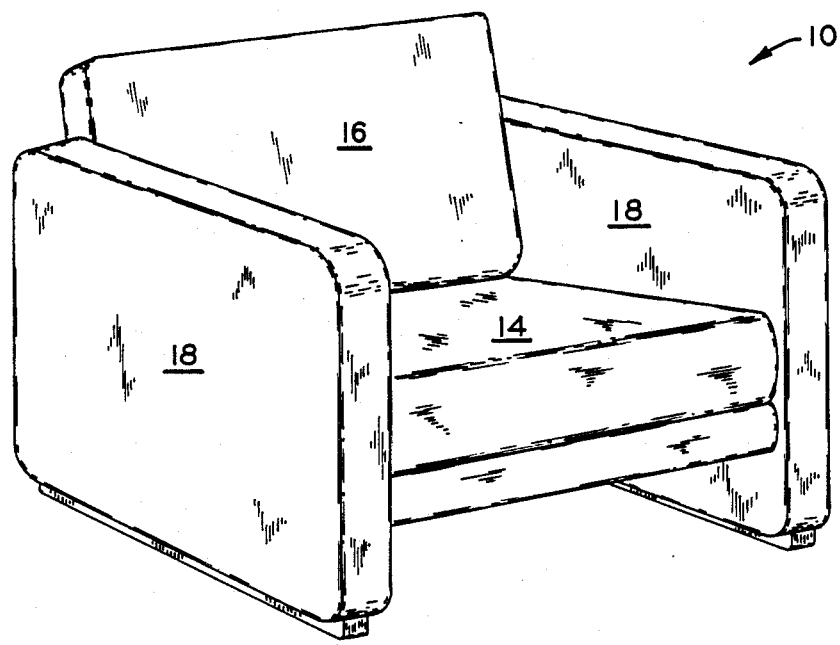
FIG. 1 is a perspective view of a unit of furniture, such as a lounge-type chair, which has a frame employing the features of the present invention.
Figure 2:
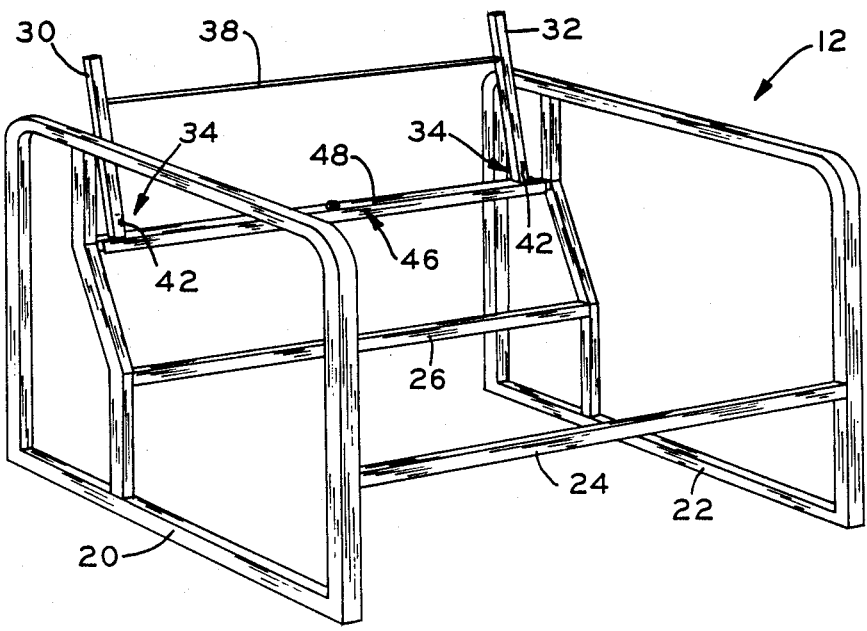
FIG. 2 is a perspective view, on a slightly larger scale, of a frame employed by the furniture unit of FIG.

Referring now to the drawings, and particularly to FIGS. 1 and 2, there is shown, respectively, an assembled unit of furniture 10, such as a lounge-type chair, and an assembled frame 12 employed in the furniture unit 10, which constitutes the preferred embodiment of the present invention. The method and components used for attachment of the external parts of the furniture unit 10, such as the frame 12, seat 14, back 16 and sides 18 shown in FIG. 1, forms no part of the present invention and is the subject of copending U.S. patent application Ser. No. 95,767 entitled KNOCK-DOWN FURNITURE ASSEMBLY which is incorporated herein by reference and is assigned to the assignee of the present invention.

The frame 12 of the furniture unit 10 includes a pair of left and right side frame portions 20, 22 to which the external sides 18 of the unit 10 are attached, and a pair of front and rear bottom cross frame members 24, 26 which extend between and interconnect the side frame portions 20, 22 and to which the seat 14 of the unit 10 is attached. Finally, the frame 12 includes a rear upper cross frame member 46 and a pair of left and right upper side frame members 30, 32 to which the back 16 of the unit 10 is attached. As further explained hereinafter, member 46 is secured to a cross frame member 28 (see FIG. 3) which is secured to side frame portions 20 and 22. When the frame 12 is assembled as shown in FIG. 2, the side frame portions 20, 22 are disposed in parallel relation and in vertical positions, the frame members 24, 26 and 28 in parallel relation and horizontal positions, and the side frame members 30, 32 in parallel relation and vertical and slightly rearwardly inclined positions. It will be noted that the frame portions and members all have generally rectangular (or, more specifically, square) tubular cross-sectional configurations. The method and components used for attachment of the side frame portions 20, 22 and the cross frame members 24–28 together to provide the configuration seen in FIG. 2 is also the subject of above-cited copending U.S. application and do not need to be described herein to understand the present invention.

Turning now to FIGS. 3–6, there is shown a joint assembly, generally designated 34, for connecting the rear upper cross frame member 28 and the pair of upper side frame members 30, 32 together in accordance with the principles of the present invention. In the preferred embodiment, the joint assembly 34 has a pair of elongated generally wedge-shaped parts 36 rigidly attached to the upper cross frame member 28 in spaced apart relation to one another thereon and projecting therefrom in generally parallel relation. One of the edges 36A of each wedge-shaped part 36 is tapered or inclined toward the opposite straight edge 36B which extends generally perpendicularly to the frame member 28.

The upper side frame members 30, 32 are spaced apart by a cross brace frame member 38 that extends between and at its opposite ends is rigidly attached to the upper side frame members 30, 32 so as to dispose them in generally parallel relation to one another. Each of the upper side frame members 30, 32 is open at a same one lower end 40.

The joint assembly 34 also includes an indented portion 42 which protrudes in an inwardly inclined relation within the interior of each of the tubular side frame members 30, 32 relative to the front side 30A, 32A of each member and is located above its open end 40 so as to define a generally wedge-shaped pocket 44 with the opposite rear side 30B, 32B of each side frame member 30, 32. Each pocket 44 thus has a wedge-shaped configuration bounded by the frame member front and rear sides 30A, 30B, 32A, 32B and indented portion 42 that is generally complementary to the wedge-shaped configuration defined by the tapered and straight edges 36A, 36B of each joint part 36. Therefore, the wedge-shaped parts 36 can be removably inserted and received in relatively tight, frictional fitting relation within the wedge-shaped pockets 44 to provide the pair of side frame members 30, 32 in assembled positions on the cross frame member 28. In their assembled state, the upper rear cross frame member 28 and upper side frame members 30, 32 provide a frame subassembly for the back 16 of the furniture unit 10.

The joint assembly 34 also includes an attachment arrangement, by way of a generally designated cross frame member 46, which is provided for releasably securing the upper side frame members 30, 32 and the rear upper cross frame member 28 together once the wedge-shaped parts 36 have been received within the wedge-shaped pockets 44 and the members 28–32 are in their assembled relationship. The cross frame member 46 includes an elongated base member 48 which extends between and is rigidly attached to and supports the upper side frame members 30, 32 adjacent their lower open ends 40. Centrally-located holes 50, 52 are defined respectively in the base member 48 and in upper and lower sides 28A and 28B of the rear upper cross frame member 28. The holes 50, 52 are aligned with one another when the cross frame member 28 and the side frame members 30, 32 are in their desired assembled positions. An internally-threaded sleeve 54 is disposed through the hole 50 in the base member 48 and attached thereon by a plate 56. A fastener in the form of a bolt 58 with a washer is insertable through the aligned holes 50, 52 and threadable into the sleeve 54 to rigidly and releasably clamp the base member 48 upon the upper side 28A of the cross frame member 28. The cross frame member 46 further includes elongated front and rear cover members 62, 64 attached along opposite front and rear longitudinal edges of the base member 48. The cover members 62, 64 extend generally parallel and downwardly therefrom along opposite front and rear sides 28C, 28D of the rear upper cross frame member 28 such that the base and cover members 48, 62, 64 partially enclose the same.

The upper side frame members 30, 32 are capable of being adjusted as a unit along the cross frame member 28 to provide them in the desired assembled relationships in which the holes 50, 52 are aligned for insertion of the locking bolt 58. Such lateral adjustment is permitted due to the fact that the cross-section of each of the wedge-shaped parts 36 has a thickness that is smaller than the transverse width between opposite right and left sides 30C, 30D and 32C, 32D of the left and right side members 30, 32 which together with the front and rear sides 30A, 30B and 32A, 32B thereof define the wedge-shaped pockets 44. Therefore, each wedge-shaped part 36 is capable of being slidably moved toward and away from the opposite right and left sides of the one wedge-shaped pocket 44 so as to adjust positions of the wedge-shaped parts 36 within the wedge-shaped pockets 44 and thereby adjust the assembled positions of the side frame members 30, 32 along the cross frame member 28.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. In a furniture frame having a plurality of frame members, a detachable joint assembly comprising:
   an elongated generally tapered part rigidly projecting from one of said frame members;
   pocket means defined by an open end of another of said frame members and an indented portion of said another frame member adjacent said open end, said pocket means adapted for removably receiving said tapered part in a relatively tight, frictional fitting relation to provide said one frame member in an assembled position relative to said another frame member, the cross section of said tapered part having a thickness that is smaller than the transverse width between opposite sides of said pocket, said tapered part capable of being slidably moved toward and away from the opposite sides of said pocket so as to adjust the position of said tapered part within said pocket between said opposite sides thereof, whereby the assembled position of said one frame member may be adjusted along said another frame member.

2. The joint assembly as recited in claim 1, further comprising:
   an attachment arrangement operable for detachably securing said one and another frame members together once said tapered part has been adjusted to a desired position within said wedge-shaped pocket and said one frame member has been adjusted to a desired assembled position along said another frame member.

3. In a furniture frame having a plurality of frame members, a detachable joint assembly comprising:
   at least a pair of elongated generally tapered parts attached to one of said frame members in spaced apart parallel relation to one another and projecting therefrom; and
   at least a pair of said frame members being generally parallel, each said parallel frame members having an open end with a pocket defined therein having a configuration generally complimentary to said tapered parts, each said pockets adapted for removably receiving one of said tapered parts in a relatively tight, frictional fitting relation to provide said frame member pair in assembled position relative to said one frame member.

4. The joint assembly as recited in claim 3, wherein said pocket in each frame member of said pair thereof is defined by an indented portion of said frame member located adjacent said open end thereof.

5. The joint assembly as recited in claim 3, wherein the cross-section of each of said tapered parts has a thickness that is smaller than the transverse width between opposite sides of the corresponding one of said pockets.

6. The joint assembly as recited in claim 5, wherein each said tapered part is capable of being slightly moved toward and away from said opposite sides of said one pocket so as to adjust the positions of said tapered parts within said pockets between said opposite sides thereof and thereby adjust the assembled positions of said frame member pair along said one frame member.

7. The joint assembly as recited in claim 6, further comprising:
   an attachment arrangement operable for releasably securing said frame member pair and said one frame member together once said tapered parts have been adjusted to desired positions within said pockets and said frame member pair have been adjusted to desired assembled positions along said one frame member.

8. The joint assembly as recited in claim 7, wherein said attachment arrangement includes:
   a base member extending between and rigidly attached to said frame member pair adjacent their open ends;
   means defining holes in said base member and said one frame member, said holes being aligned with one another when said frame member pair is in the desired assembled position along said one frame member; and
   means insertable through said aligned holes and being operable to rigidly and releasably clamp said base member to said one frame member.

9. The joint assembly as recited in claim 8, wherein said attachment further includes cover members attached along opposite edges of said base member and extending generally parallel therefrom along opposite sides of said one frame member such that said base and cover members partially enclose the same.

10. In a furniture frame, the combination comprising;
    one frame member having a rectangular tubular cross-section configuration;
    a pair of elongated generally tapered parts rigidly attached to said one frame member in spaced apart relation to one another thereon and projecting therefrom in generally parallel relation; and
    a pair of other frame members and a cross brace frame member extending between and at its opposite ends rigidly attached to said other frame members so as to dispose said other frame members in generally parallel relation to one another;
    each of said other frame members having opposite ends and a rectangular tubular cross-sectional configuration, the same one of said opposite ends of each of said other frame members being open with a pocket defined therein by an indented portion of said frame member located adjacent said open end thereof, said each pocket having a configuration generally complementary to that of a corresponding one of said tapered parts for removably receiving said tapered parts in a relatively tight, frictional fitting relation to provide said pair of other frame members in assembled positions relative to said one frame member.

11. The furniture frame as recited in claim 10, wherein the cross-section of each of said tapered parts has a thickness that is smaller than the transverse width between opposite sides of the corresponding one of said pockets.

12. The furniture frame as recited in claim 11, wherein said each wedge-shaped part is capable of being slidably moved toward and away from said opposite sides of said one pocket so as to adjust positions of said tapered parts within said pockets between said opposite sides thereof and thereby adjust the assembled positions of said pair of other frame members along said one frame member.

13. The furniture frame as recited in claim 10, further comprising:
   an attachment arrangement operable for releasably securing said pair of other frame members and said one frame member together once said tapered parts have been adjusted to desired positions within said pockets and said pair of other frame members have been adjusted to desired assembled positions along said one frame member.

14. The furniture frame as recited in claim 13, wherein said attachment arrangement includes:
   a base member extending between and rigidly attached to said other frame members adjacent their open ends;
   means defining holes in said base member and said one frame member, said holes being aligned with one another when said other frame members are in the desired assembled positions along said one frame member; and
   means insertable through said aligned holes and being operable to rigidly and releasably clamp said base member to said one frame member.

15. The furniture frame as recited in claim 14, wherein said attachment arrangement further includes cover members attached along opposite edges of said base member and extending generally parallel therefrom along opposite sides of said one frame member such that said base and cover members partially enclose the same.

* * * * *